(12) United States Patent
Creamer et al.

(10) Patent No.: US 7,139,373 B2
(45) Date of Patent: Nov. 21, 2006

(54) SERVICE DELIVERY INSTRUCTION PROCESSING SYSTEM AND METHOD

(75) Inventors: Thomas E. Creamer, Boca Raton, FL (US); Peeyush Jaiswal, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 10/741,382

(22) Filed: Dec. 19, 2003

(65) Prior Publication Data

US 2005/0135580 A1  Jun. 23, 2005

(51) Int. Cl.
*H04M 1/56* (2006.01)
*H04M 3/05* (2006.01)

(52) U.S. Cl. .................. 379/142.05; 379/142.06; 379/265.01; 379/265.02; 379/265.09

(58) Field of Classification Search .......... 379/142.03, 379/142.04, 142.05, 265, 142.06, 265.01, 379/265.02, 265.09
See application file for complete search history.

(56) References Cited

U.S. PATENT DOCUMENTS

2002/0101853 A1* 8/2002 Siegrist et al. ............. 370/352
2002/0169719 A1* 11/2002 Dively et al. ................. 705/40
2003/0135592 A1* 7/2003 Vetter et al. ................ 709/220
2004/0151300 A1* 8/2004 Marwell et al. ........ 379/265.13

OTHER PUBLICATIONS

Lozinski, Zygmunt, *Parlay/OSA—A New Way to Create Wireless Services*, IBM, submitted to "IEC Mobile Wireless Data" May 15, 2003, revised Jun. 1, 2003.

* cited by examiner

*Primary Examiner*—Barry Taylor
(74) *Attorney, Agent, or Firm*—Richard A. Tomlin; Steven M. Greenberg; Carey, Rodriguez, Greenberg & Paul, LLP

(57) ABSTRACT

A method, system and apparatus for managing delivery service instructions. A method for managing delivery service instructions can include receiving a telephone call from a customer through a PSTN linkage. Identifying information for the customer can be retrieved through a data communications network linkage without identifying said customer using data derived from the telephone call. As such, the retrieved identifying information can be correlated with the telephone call. Finally, access to apply delivery service management instructions received over the PSTN linkage can be authenticated based upon the identifying information.

13 Claims, 3 Drawing Sheets

SERVICE DELIVERY INSTRUCTION PROCESSING SYSTEM AND METHOD

BACKGROUND OF THE INVENTION

1. Statement of the Technical Field

The present invention relates to the management of service delivery instructions for a telephone subscriber, and more particularly to the management of service delivery instructions based upon call processing provided in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7 signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing customer information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the business name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center and in the customer service industry. For instance, oftentimes a customer receiving a product for delivery will attempt to manage the delivery of the product by contacting the product vendor for delivery information. The management of the delivery can range from determining a more accurate delivery time to changing the delivery time, the delivery address, the delivery instructions, or the identity of a person authorized to sign for the delivery.

As the delivery of a product can be the last element of control by the vendor applied to the product, the vendor wisely is to remain cautious in permitting the telephonic modification of delivery instructions. To that end, the vendor (or the delivery agency) can require the customer to produce ample evidence of the identity of the customer. Generally, the evidence can include name, home address, phone number, social security number, order number, account number, delivery address, billing address, credit card number, credit card authorization code, a PIN code, and countless other forms of identifying information.

Of course, for the typical customer on the go, access to this type of information can be difficult, particularly when the customer cannot access the requisite paperwork. As a result, customers are forced to speak with several layers of customer service representatives without a guarantee that the customer will be successful in changing or confirming the delivery process for an ordered good or service. In consequence, customers can become irritated conversing with one or more customer service representatives, an interactive voice response system, or both simply to provide identifying information sufficient to manage the delivery of the product or service.

SUMMARY OF THE INVENTION

The present invention addresses the deficiencies of the art in respect to the management of delivery instructions for delivering goods to a telephone subscriber and provides a novel and non-obvious method, system and apparatus for managing delivery instructions for delivering goods to a telephone subscriber using identifying information provided through the PSTN to a delivery center. A method for managing delivery service instructions can include receiving a telephone call from a customer through a PSTN linkage. Identifying information for the customer can be retrieved through a data communications network linkage without identifying said customer using data derived from the telephone call. As such, the retrieved identifying information can be correlated with the telephone call. Finally, access to apply delivery service management instructions received over the PSTN linkage can be authenticated based upon the identifying information.

In a preferred aspect of the present invention, the retrieving step can include the step of retrieving information for the customer through a data communications network linkage to a name resolution adapter coupled to at least one telephone subscriber database disposed in a switch in the PSTN. The retrieving step further can include the step of querying an enterprise application for managing delivery service instructions using the identifying information. In this regard, the customer can be prompted to replay or modify existing delivery service instructions disposed in the enterprise application. Also, billing information for the customer can be recorded based upon the authenticated access to apply delivery service management instructions.

In a system for managing delivery service instructions, a telephone subscriber database can be disposed in a switch in the PSTN. An enterprise application can be configured to manage delivery service instructions for a plurality of telephone subscribers in the PSTN. Finally, a name resolution adapter can be disposed in the PSTN and coupled both to the telephone subscriber database in the PSTN, and also to the enterprise application over a data communications network. Notably, the system can include an interactive voice response system coupled both to the enterprise application through a data communications link, and also to the PSTN through a telephony gateway. Alternatively, a voice browser can be coupled both to the enterprise application through a data communications link, and also to the PSTN through a telephony gateway.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for managing delivery instructions through a PSTN. As used herein, delivery instructions can include the specification or modification of a time or place for the delivery of goods or services. Additionally, the term delivery instructions can include the specification of a delivery process such as requiring zero or more signatures by particular individuals, directions to the address, and one or more actions to be performed prior to, during and subsequent to the physical delivery of the goods or services. The management of the delivery instructions can be performed by the vendor of the goods or services, or a delivery agent acting on behalf of the vendor.

In accordance with the present invention, a customer can contact the delivery service over a PSTN to manage the delivery of the goods or services. When attempting to place the call, the call can be intercepted within the PSTN and identifying information for the calling customer can be extracted from a database within the PSTN. The identifying information can be provided over a data communications network to the delivery service. Using the identifying information received over the data communications network, the delivery service can retrieve information regarding the delivery of goods or services and also, the delivery service can instantly authenticate the calling customer based upon the identifying information.

As the call from the customer is completed over the PSTN, the identifying information, and in particular, the retrieved information, can be correlated to the completed call such that an operator or an automated call center in the delivery service can access the information through the data communications network while processing the completed call from the customer. Significantly, as the identifying information can be resolved externally to the service provider from a trusted source within the PSTN, the delivery service can manage the delivery of the goods or services without first prompting the customer for identifying information.

Figure 1:
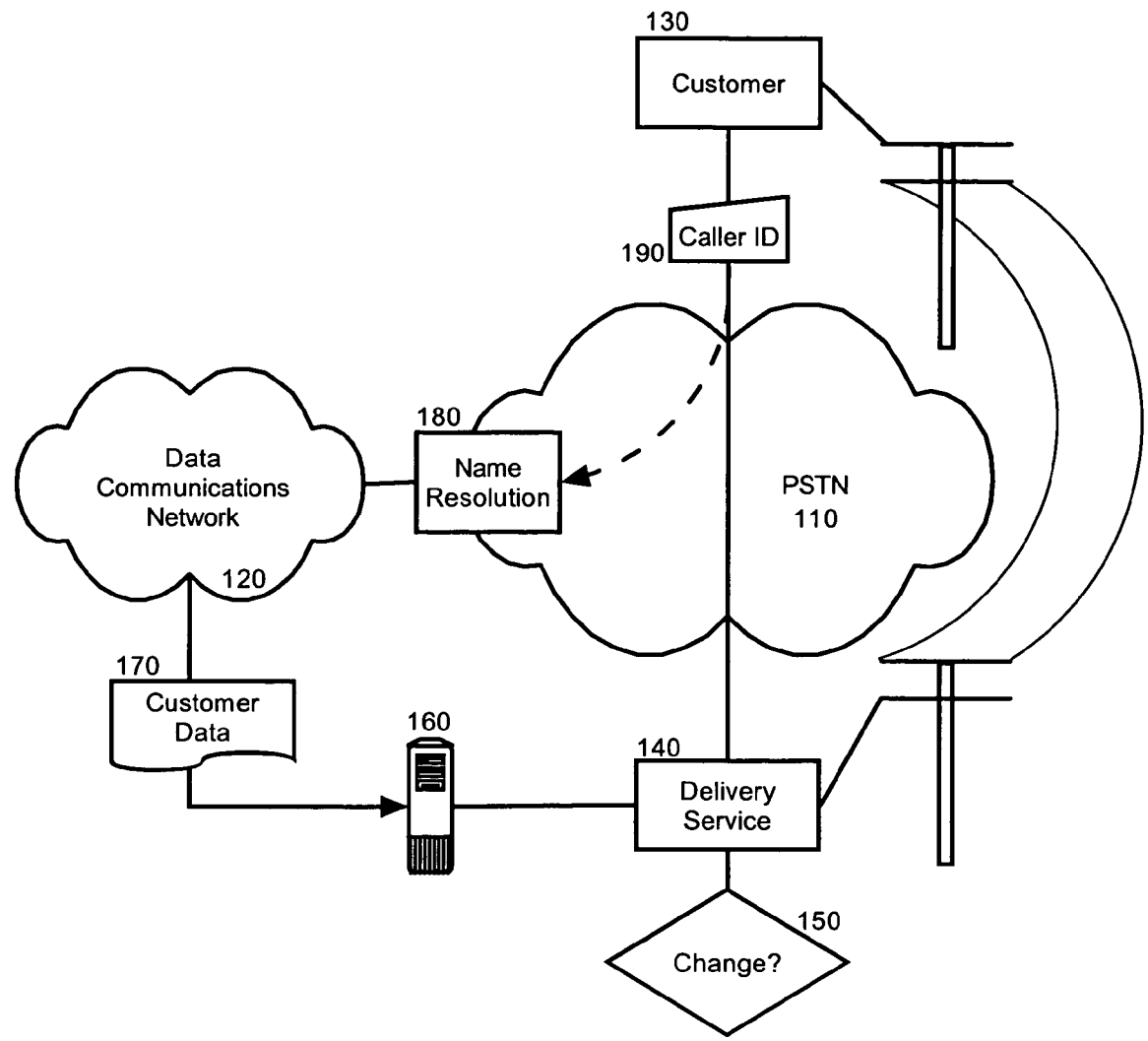
FIG. 1 is a block diagram illustrating a process for managing delivery instructions through a PSTN according to the inventive arrangements.

In further illustration, FIG. 1 is a block diagram illustrating a system, method and process for managing delivery instructions according to the inventive arrangements. Specifically, a customer 130 having order one or more goods or services to be delivered according to delivery instructions can be coupled to a delivery service 140 telephonically by way of the PSTN 110. As the customer 130 initiates the telephone call in the PSTN 110, a name resolution adapter 180 disposed within the PSTN 110 can capture the caller identification 190 for the customer 130 to identify the customer 130.

Using the caller identification 190, the name resolution adapter can produce corresponding identification data 170 for the customer 130, for instance a name, address, phone number, credit card number, or account number, to name a few. In this regard, the name resolution adapter 180 can query one or more databases disposed within the PSTN 110 to obtain corresponding identifying data 170 for the caller identification 190. Once the name resolution adapter 180 has acquired the identification data 170, the name resolution adapter 180 can provide the identification data 170 to an enterprise application 160 associated with the delivery service 140 over the data communications network 120. Concurrently, the call between the customer 130 and the delivery service 140 can be established over the PSTN 110.

Once the enterprise application 160 has received the identification data 170 for the customer 130, the enterprise application 160 can use the identification data 170 to obtain the delivery records for the customer 130. Importantly, the enterprise application 160 can retrieve the subscription records without first having annoyingly prompted the customer 130 over the PSTN 110 for identifying information. In any case, delivery instructions management logic 150 can prompt the customer 130 to manage the delivery of goods or services ordered by the customer 130. In this regard, the customer 130 can be prompted manually through the voice of a human operator, or automatically through an interactive voice response system or through a voice browser the operation of which is well known in the art.

In particular, the customer 130 can select a confirmation of the delivery instructions by the delivery service 140. Additionally, the customer 130 can select a change to the delivery instructions. In this regard, the enterprise application 160 can update the delivery records accordingly. Remarkably, the foregoing delivery instructions management process can be performed over the PSTN without requiring a single identifying prompt, or the resolution of caller identifying data in the enterprise application 160.

Figure 2:
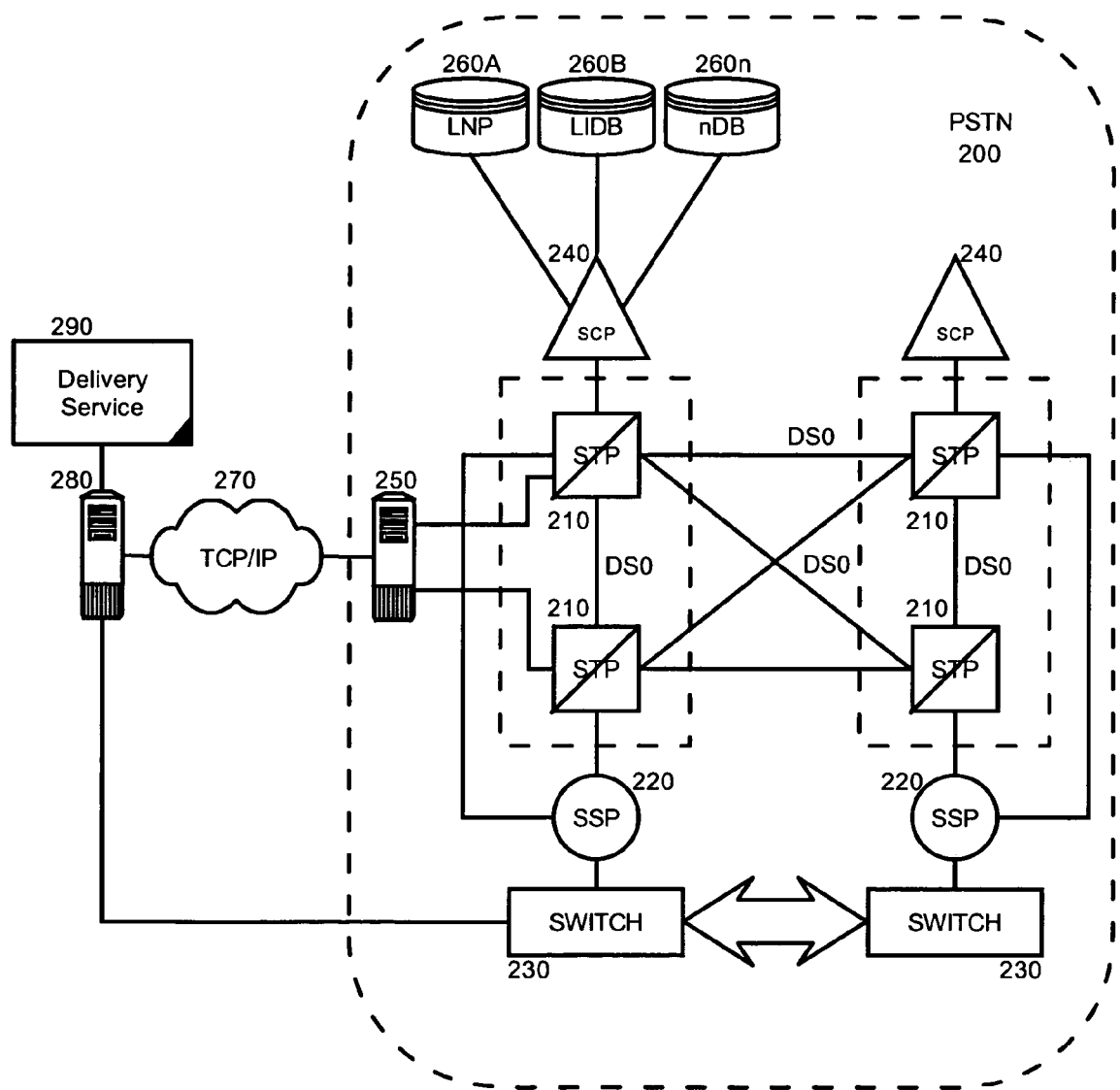
FIG. 2 is a schematic illustration of a system for managing delivery instructions using identifying information acquired within a PSTN; and, FIG. 3 is a flow chart illustrating a process for managing delivery instructions in the system of FIG. 2.

To further illustrate the preferred embodiments of the present invention, FIG. 2 is a schematic illustration of a system for managing a delivery service using identifying information acquired within a PSTN. As shown in FIG. 2, a system for managing a delivery service using identifying information acquired within a PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

Figure 3:
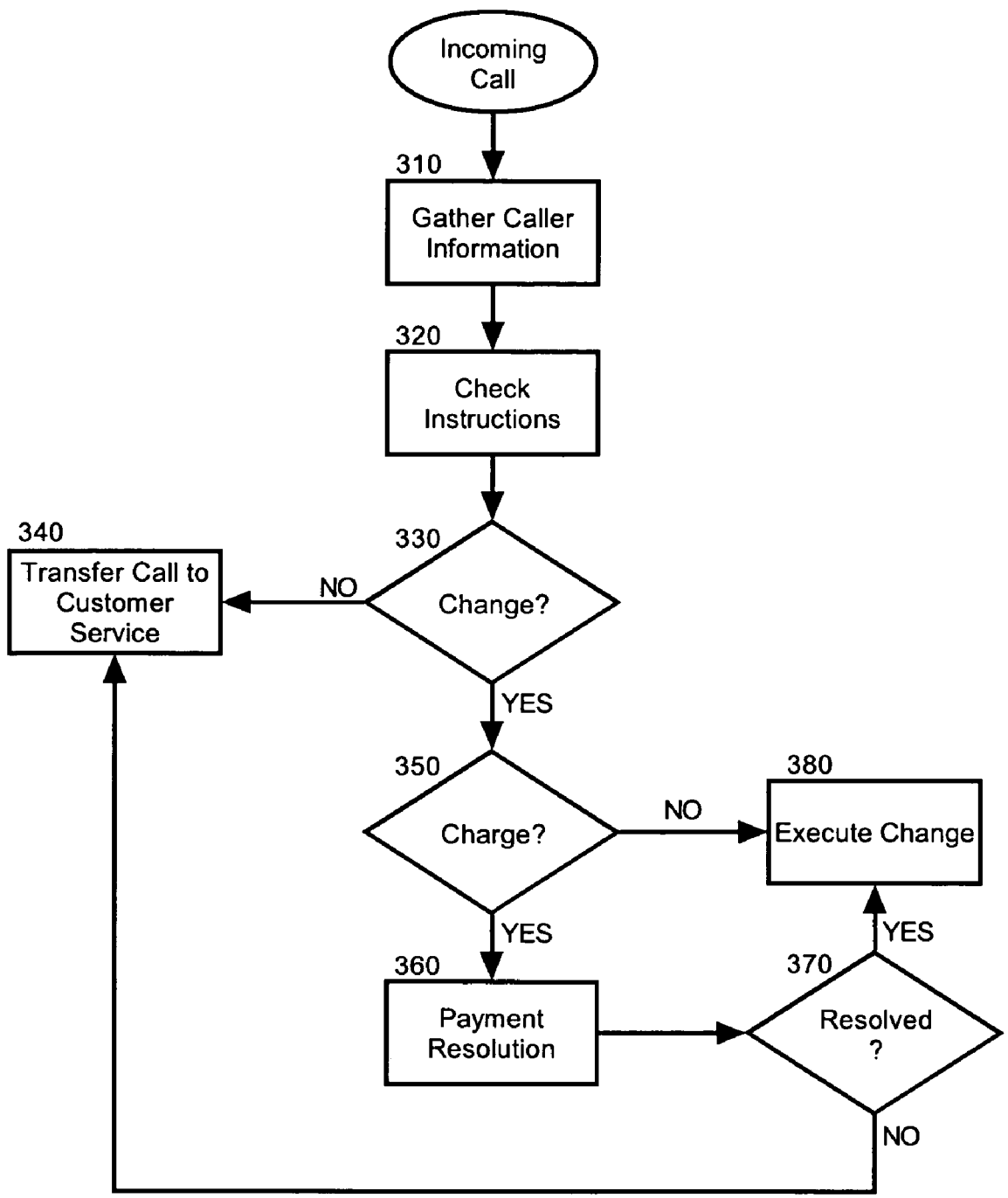

In a preferred aspect of the present invention, delivery service instructions management logic 290 can be coupled to the enterprise application 280. The delivery service instructions management logic 290 can provide a facility through which telephone subscribers can manage delivery instructions for goods or services without requiring the telephone subscribers to respond to exhaustive prompting necessary to identify the telephone subscribers. In further illustration, FIG. 3 is a flow chart illustrating a process for managing delivery instructions in the system of FIG. 2.

Beginning in block 310, a calling party known to the PSTN can be identified as attempting to establish a call to a switch associated with the delivery service instructions management system of the present invention. In this regard, the PSTN internally can resolve the identity of the caller based upon the phone number corresponding to the call attempt. Subsequently, the PSTN can communicate the identity of the caller to the delivery service instructions management system. Specifically, the PSTN can provide the identity of the caller through a computer communications network coupled to the delivery service instructions management system. Concurrently, the PSTN can establish the call without regard to the name resolution activities occurring through the data communications network and a correlation can be established between the call and the identity of the caller.

In decision block 320, the delivery service instructions management system can retrieve the delivery instructions for goods or services which correspond to the identity of the caller. Specifically, to formulate suitable delivery service instructions management options for the caller, the delivery service instructions management system can retrieve the subscriber records for the caller based upon the identifying data provided by the PSTN through the data communications network. Once the existing delivery service instructions are retrieved, in decision block 330 the caller can be prompted for management instructions.

To the extent that the caller indicates a preference to change the delivery instructions, the process can continue through decision block 350. Otherwise, in block 340 the caller can be transferred to a customer service representative who can provide further assistance to the caller. Importantly, the customer service representative can provide the further assistance without requiring the caller to provide excessive authentication information. Rather, the authentication information will have been provided in block 310 by the trusted source within the PSTN.

In any event, in decision block 350, it can be determined whether the caller is to be charged for the use of the delivery instructions management service in changing the delivery instructions. If so, in block 360, payment can be resolved for the charge and in decision block 370 it can be determined if the payment had been successfully resolved. If so, in block 380, the preferred change to the delivery instructions can be processed which can include a changing of a delivery time, a delivery address, and one or more actions to be performed either prior to, during or after the delivery of the goods or services.

It is to be understood by the skilled artisan that the process of FIG. 3 merely represents an exemplary process for use in accordance with the present invention and that many variations of the exemplary process will fall within the scope of the present invention. In this regard, at the outset of establishing the call between the customer and the delivery service, the customer can be prompted with a menu of possible delivery service instructions management options including not only changes to existing delivery instructions, but establishing new delivery instructions, or merely playing back existing delivery instruction information. Moreover, the delivery service instructions management process can be provided at no cost to the customer, or at a varying cost based upon the desired action. Other variations also are possible.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for managing delivery service instructions, the method comprising:

receiving a telephone call in a call center from a customer through a public switched telephone network (PSTN) linkage, the call center and the customer both being coupled to different portions of the PSTN;

retrieving identifying Information for said customer from the PSTN through a data communications network linkage externally and separately from the PSTN linkage without identifying said customer using data derived from said telephone call, the data communications network linkage originating in the PSTN and terminating in the call center;

correlating said retrieved identifying information with said telephone call; and, authenticating access to apply delivery service management instructions received over said PSTN linkage based upon said identifying information.

2. The method of claim 1, wherein said retrieving step comprises the step of retrieving information for said customer through a data communications network linkage to a name resolution adapter coupled to at least one telephone subscriber database disposed in a switch in said PSTN.

3. The method of claim 2, further comprising the step of prompting said customer to replay or modify existing delivery service instructions disposed in said enterprise application.

4. The method of claim 1, wherein said retrieving step further comprises the step of querying an enterprise application for managing delivery service instructions using said identifying information.

5. The method of claim 4, further comprising the step of recording billing information for said customer based upon said authenticated access to apply delivery service management instructions.

6. A system for managing delivery service instructions, the system comprising:

a telephone subscriber database disposed in a switch in a public switched telephone network (PSTN);

an enterprise application disposed in a call center coupled to one end of the PSTN and configured to manage delivery service instructions for a plurality of telephone subscribers coupled to the PSTN at another end; and, a name resolution adapter disposed in said PSTN and coupled both to said telephone subscriber database in said PSTN, and also to said enterprise application over a data communications network link originating in the PSTN and terminating in the call center with the enterprise application.

7. The system of claim 6, further comprising an interactive voice response system coupled both to said enterprise application through a data communications link, and also to said PSTN through a telephony gateway.

8. The system of claim 6, further comprising a voice browser coupled both to said enterprise application through a data communications link, and also to said PSTN through a telephony gateway.

9. A machine readable storage having stared thereon a computer program for managing delivery service instructions, the computer program comprising a routine set of instructions which when executed by a machine cause the machine to perform the steps of:

receiving a telephone call in a call center from a customer through a public switched telephone network (PSTN) linkage, the call center and the customer both being coupled to different portions of the PSTN;

retrieving identifying information for said customer from the PSTN through a data communications network linkage externally and separately from the PSTN linkage without identifying said customer using data derived from said telephone call, the data communications network linkage originating in the PSTN and terminating in the call center;

correlating said retrieved identifying information with said telephone call; and, authenticating access to apply delivery service management instructions received over said PSTN linkage based upon said identifying information.

10. The machine readable storage of claim 9, wherein said retrieving step comprises the step of retrieving information for said customer through a data communications network linkage to a name resolution adapter coupled to at least one telephone subscriber database disposed in a switch in said PSTN.

11. The machine readable storage of claim 10, further comprising the step of prompting said customer to replay or modify existing delivery service instructions disposed in said enterprise application.

12. The machine readable storage of claim 9, wherein said retrieving step further comprises the step of querying an enterprise application for managing delivery service instructions using said identifying information.

13. The machine readable storage of claim 12, further comprising the step of recording billing information for said customer based upon said authenticated access to apply delivery service management instructions.

* * * * *